Aug. 16, 1932. A. F. UNDERWOOD 1,872,365
LUBRICATING SYSTEM
Filed Dec. 26, 1929

Inventor
Arthur F. Underwood
By Blackmore, Spencer, & Flinn
Attorneys

Patented Aug. 16, 1932

1,872,365

UNITED STATES PATENT OFFICE

ARTHUR FRANCIS UNDERWOOD, OF DETROIT, MICHIGAN, ASSIGNOR TO GENERAL MOTORS RESEARCH CORPORATION, OF DETROIT, MICHIGAN, A CORPORATION OF DELAWARE

LUBRICATING SYSTEM

Application filed December 26, 1929. Serial No. 416,445.

This invention relates to lubricating systems and has particular reference to the lubricating system applied to the internal combustion engines used on automotive vehicles.

During the starting period of the engine it is desirable to have a quantity of oil on the throws of the crankshaft so that as the crankshaft revolves the oil may be thrown about to lubricate certain parts of the engine such as the cylinder walls, the camshaft, et cetera. This oil at the throws of the crankshaft is usually obtained from the oil which is forced from the crankpin bearings of the shaft. At slow engine speeds, particularly during starting, the usual oil pump does not force sufficient oil through the system to allow any appreciable quantity to be forced from the crankpin bearings to spill on the crank throws and be thrown about. For this reason, it is desirable to apply some means which will increase the oil flow at the crankshaft to enable more oil to be passed or thrown so that the crankshaft will be able better to lubricate the engine parts.

As the engine speeds up it is also desirable to decrease to an appreciable extent the quantity of oil consumed for the reason that adequate lubrication of the crankpin bearings is easily obtained by a much lesser quantity of oil than is forced by the pump. When the engine is hot and in good working order the lubricant will flow more readily from the crankpin bearings of the crankshaft and may be thrown about with greater ease because it is in a less viscous state but will still adequately lubricate the cylinder walls or such other parts as may be lubricated from the oil thrown from the crankshaft.

The object of the invention is accomplished by drilling through the throws of the crankshaft the usual lubricant passage which conducts oil from the main crankshaft bearings to the crankpins. The passage, however, instead of passing centrally through the main crankshaft bearing, is formed at one side of the journal. The purpose of this change in position of the usual oil passage is to decrease the back pressure against the pump due to the centrifugal force of the column of oil between the center of the crankshaft and the periphery of the bearing portion. It has been found in actual practice that at high speeds this centrifugal force exceeds the pump pressure and seriously interferes with the efficient lubrication of the crankshaft. It has been found that by drilling a lateral passage in the cheeks of the crankshaft at the throws and in communication with the oil passage, that a greater flow of oil will be obtained at low speeds for the reason that the oil taken up by the pump will readily flow from the mouth of this lateral passage and spill over the crankshaft throws. This will increase the quantity of oil flow and readily provide the throws of the crankshaft with a supply of oil to be thrown about. At higher speeds the centrifugal force is so great that the oil will not flow from the lateral passage onto the crankthrow but air will be sucked in and will pass into the oil column and thereby reduce the quantity of oil consumed for the reason that the oil will be diluted with the air taken in by the lateral passage. This lateral passage, therefore, serves as a means for increasing the oil flow at low speeds and decreasing the quantity of oil consumed at high speeds. By suitable experiment the proper size of lateral passage to be used with a particular engine can be readily determined.

If desired, a spring loaded valve may be placed over the mouth of the lateral passage where it leaves the crankshaft, the spring always tending to hold the valve in its seat. At low speeds the oil pressure will unseat the valve to allow oil flow therefrom, and at higher speeds the centrifugal force will maintain the valve from its seat to permit the inflow of air. In actual practice it has been found that this valve is not necessary but the same results will be obtained by using an obstructed passage.

Figure 1:
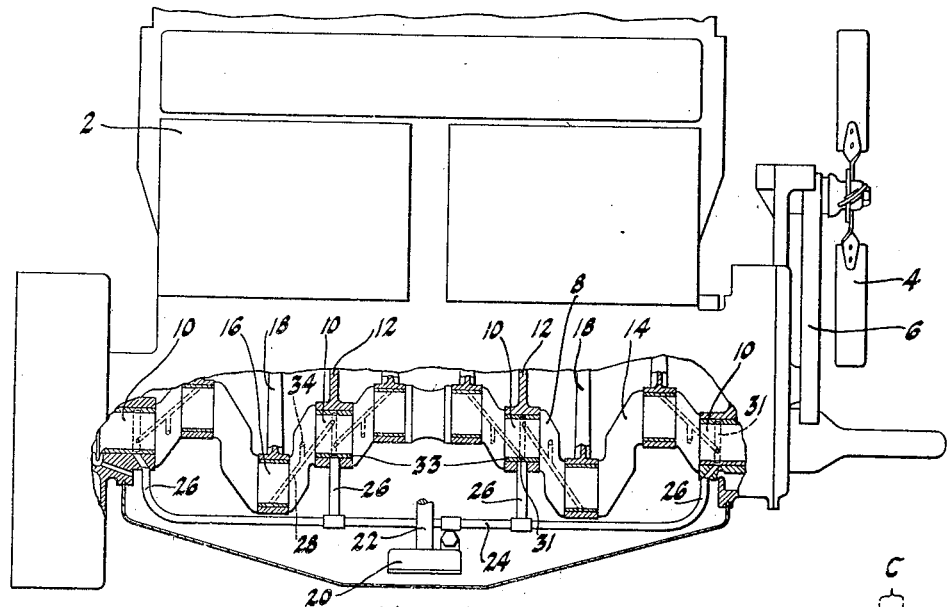
Figure 1 shows an internal combustion engine with parts broken away to illustrate the invention.
Figure 2:
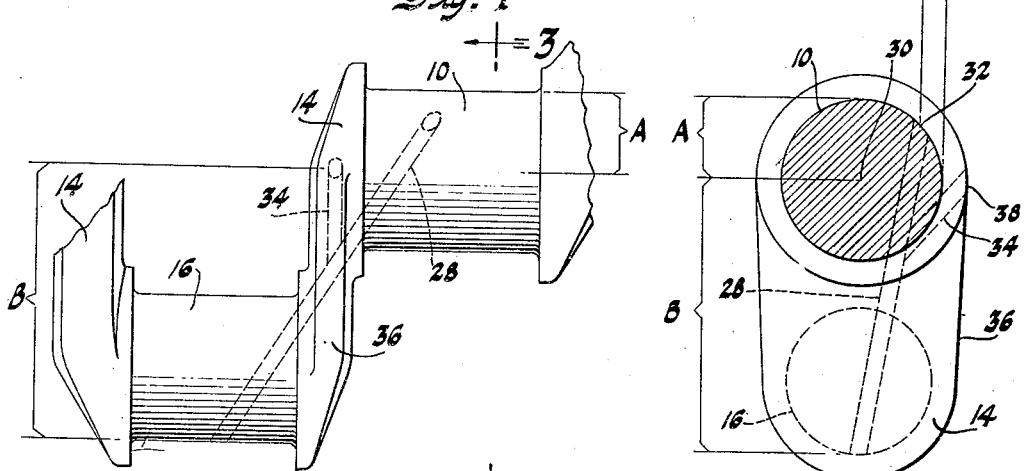
Figure 2 is an enlarged detail of a throw of the crankshaft with the invention applied.

Referring to the drawing, the numeral 2 indicates an internal combustion engine as a whole. The engine has the usual fan 4 driven from a belt 6 operated from the crankshaft 8. The crankshaft is mounted in the main bearings 10 formed in the end and intermediate ribs 12 of the crankcase. The crankshaft has the usual throws 14 and the crankpins 16 to which there are joined the connecting rods 18 connected to the piston (not shown) in the usual way. The oil pump is indicated at 20 driven by a shaft 22 from the crank or camshaft in any suitable way. The pump forces the oil into the manifold 24 having arms 26 leading to the main bearings 10 to lubricate the crankshaft.

The parts so far described are conventional and per se form no part of the invention.

Figure 3:
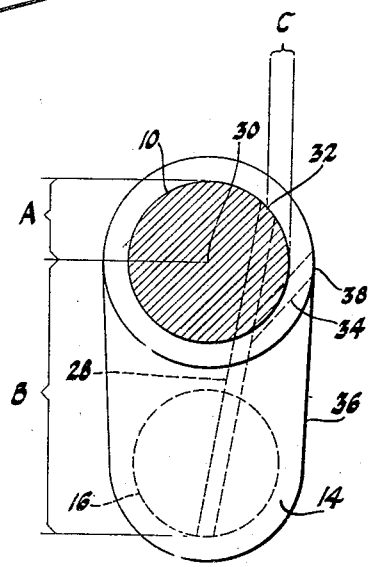
Figure 3 is a section on the line 3—3 of Figure 2.

In order to obtain an adequate supply of lubricant to the crankpins 16, certain throws of the crankshaft are provided with passages 28 which lead from the periphery of the main bearing 10 to the periphery of the crankpin 16. As is best seen in Figure 3, the passage 28 does not pass through the center 30 of the crankshaft bearing but is positioned at one side thereof so that its mouth or inlet 32 will receive oil from the usual groove 31 in the usual half bearings 33 surrounding the main bearing portions 10 of the crankshaft. The reason for offsetting the oil passage 28 is to reduce the centrifugal force brought about by the column of the oil indicated at A. At high speeds, it has been found that the back pressure caused by the column of oil A is sufficient to substantially nullify the operation of the pump so that an insufficient quantity of oil will reach the crankpin bearing 16. This is true regardless of the fact that the distance B is much greater than the distance A and has a longer column of oil. It has been found in actual practice that owing to the fact that the bearings cannot be made absolutely tight, there will be a certain amount of air drawn in which will destroy the theoretical action of the oil columns A and B. By placing the oil passage 28 at one side, it decreases to a large extent the effect of the centrifugal force for the reason that the column of oil has been reduced to a distance C. The difference in the length of the oil columns A and C is sufficient to make a very marked increase in the efficiency of the operation of the oiling system at high speeds.

In order to increase the flow of oil in the passage 28 at low speeds, there has been provided the lateral passage 34 which is drilled in the cheek 36 of the throw 14. This passage communicates with the passage 28 and during low speeds when all of the oil forced by the pump cannot be taken by the crankpin bearing 16, the excess oil will flow from the passage 34 and spill over the throw 14 to be thrown about the crankcase to lubricate the engine. These lateral passages 34 will accordingly increase the flow of oil at low speeds for the reason that they allow a ready exit for the oil but will in no way interfere with the lubrication of the crankpins 16 for the reason that sufficient lubricant will pass through the passage 28 to the crankpin bearings.

At high speeds, or when the rotation of the crankthrows 14 is very appreciably greater, the centrifugal force of the column of oil B in the passage 28 will be so great that no oil will flow from the passage 34. On the contrary, air will be sucked in from the opening or mouth 38 of the passage to dilute the oil coming from the mouth 32 in the passage 28. This dilution of the oil will continue during high speeds and will accordingly diminish the consumption of oil for the reason that if no passage 34 were provided, the centrifugal force of the column of oil B would tend to draw the oil admitted at the mouth 32 and would in reality aid the pump to cause an excess or abnormal amount of oil to flow through the crankpin bearings 16. By providing the passage 34, the quantity of oil used at high speeds will be diminished because of the air drawn in at the mouth 38. The arrangement of the passages 28 and 34 will, therefore, increase the oil flow at low speeds and diminish the quantity of oil consumed at high speeds.

Figure 4:
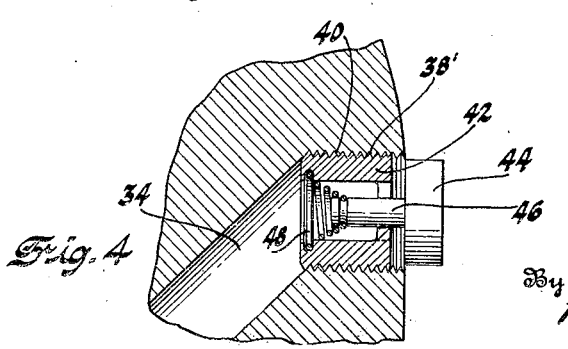
Figure 4 is a view of a modification showing a valve over the lateral passage.

By referring to Figure 4 which is an enlarged sectional detailed view of the mouth or opening 38' at the end of the passage 34, it will be seen that the orifice may be internally threaded as indicated at 40 and a threaded collar 42 screwed therein. A valve 44 fits over the collar 42 in the mouth 38' and has a stem 46 to which there is secured a coil spring 48, one end of which is mounted at the interior of the collar 42. While the valve 44 is shown lifted from its seat, it will be understood that the spring 48 normally retains the valve on its seat. At lower speeds, the oil pressure will readily lift the valve to permit oil flow of the opening 38' and at high speeds the centrifugal force is of itself sufficient to keep the valve off its seat to permit the entrance of air.

I claim:

1. In a lubricating system for engines having a crankshaft having main and crankpin bearings, a lubricant passage in said shaft leading from a main bearing portion to a crankpin bearing, and means between a main bearing and a crankpin bearing connecting said passage with the exterior of the crankshaft, said means communicating with the atmosphere at all times.

2. In a lubricating system for engines having a crankshaft having main and crankpin bearings, a lubricant passage in said shaft leading from a main bearing portion to a crankpin bearing, and a passage between a main bearing and a crankpin bearing leading from said first named passage to the exterior of the crankshaft, said passage having its end open.

3. In a lubricating system for engines having a crankshaft having main and crankpin bearings, a lubricant passage in said shaft leading from a main bearing portion to a crankpin bearing, and a lateral passage in a cheek portion of the crankshaft leading from said first named passage to the exterior of the crankshaft, said passage having its end open.

4. In a lubricating system for engines having a crankshaft having main and crankpin bearings, a lubricant passage in one of the throws of the shaft leading from a main bearing portion to a crankpin bearings, and a lateral passage in a cheek portion of said shaft leading from said first named passage to the exterior of the crankshaft, said passage having its end open.

5. In a lubricating system for engines having a crankshaft having lubricating passages and main and crankpin bearing portions, and means in the shaft forming part of the system for increasing the oil flow to the bearing portions at low engine speeds and for decreasing the quantity of oil delivered to the bearing portions at high engine speeds.

6. In a lubricating system for engines having a crankshaft having lubricating passages and main and crankpin bearing portions, and a passage in the shaft for increasing the oil flow to the bearing portions at low speeds.

7. In a lubricating system for engines having a crankshaft having lubricating passages and main and crankpin bearing portions, and a passage in the shaft for decreasing the quantity of oil delivered to the bearing portions at high speeds.

8. In a lubricating system for engines having a crankshaft having main and crankpin bearings, a lubricant passage in a throw of the crankshaft leading from a main bearing portion to a crankpin bearing portion, said passage passing through the main bearing portion at one side of the center-line thereof, and a passage leading from said first named passage to the exterior of the crankshaft.

9. In a lubricating system for engines having a crankshaft having main and crankpin bearings, a lubricant passage in a throw of the shaft leading from a main bearing portion to a crankpin bearing portion, said passage passing through said crankpin bearing portion at one side of the center line thereof, and a passage leading from said first named passage to the exterior of the crankshaft.

10. In a lubricating system for engines having a crankshaft having main and crankpin bearings, a lubricant passage in the crankshaft extending from a main bearing portion to a crankpin bearing portion, and means intermediate said bearings directly connected to said passage to permit oil to flow over the crankshaft to be thrown about the engine to lubricate parts thereof.

In testimony whereof I affix my signature.

ARTHUR F. UNDERWOOD.